(12) United States Patent
Sigler et al.

(10) Patent No.: US 7,258,263 B2
(45) Date of Patent: * Aug. 21, 2007

(54) BIPOLAR PLATE FABRICATION

(75) Inventors: David R Sigler, Shelby Township, MI (US); Yen-Lung Chen, Troy, MI (US); Xiaohong Gayden, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/738,481

(22) Filed: Dec. 17, 2003

(65) Prior Publication Data

US 2005/0133568 A1    Jun. 23, 2005

(51) Int. Cl.
  *B23K 31/02* (2006.01)
(52) U.S. Cl. .................. 228/157; 228/215; 228/235.2; 228/183; 29/890.042
(58) Field of Classification Search ............ 228/235.2, 228/157, 215, 115, 183, 3.1, 901; 29/890.041, 29/890.042
See application file for complete search history.

(56) References Cited

U.S. PATENT DOCUMENTS

| | | | | |
|---|---|---|---|---|
| 2,906,006 A | * | 9/1959 | Neel | ...................... 29/890.041 |
| 3,271,846 A | * | 9/1966 | Buechele et al. | ...... 29/890.042 |
| 3,334,398 A | * | 8/1967 | Middleton | ............. 29/890.042 |
| 3,394,446 A | * | 7/1968 | Valyi | .......................... 228/118 |
| 3,421,577 A | * | 1/1969 | Valyi | .......................... 165/170 |
| 3,981,753 A | * | 9/1976 | Hopper | ........................ 148/23 |
| 6,052,887 A | | 4/2000 | Dziadosz et al. | |
| 6,350,539 B1 | | 2/2002 | Wood, III et al. | |
| 6,358,642 B1 | | 3/2002 | Griffith et al. | |
| 6,503,653 B2 | | 1/2003 | Rock | |

FOREIGN PATENT DOCUMENTS

JP    56-89343    *    7/1981

* cited by examiner

*Primary Examiner*—Jonathan Johnson

(57) ABSTRACT

A method for making a current collector plate includes providing a first sheet of material having a first bonding face and a first outer face. A second sheet of material is provided having a second bonding face and a second outer face. A work area is defined on at least one of the first bonding face and the second bonding face. The first and second sheets are bonded together at a bonding area which is different from the work area. The bonded first and second sheet is placed into a die having a pattern defining at least one flow channel. Fluid is injected between the first and second sheets thereby causing at least one of the first and second sheets to project outward at the work area causing at least one flow channel to be formed in the work area as defined by the die pattern.

17 Claims, 10 Drawing Sheets

BIPOLAR PLATE FABRICATION

FIELD OF THE INVENTION

The present invention relates to bipolar plates, and more particularly to a method of making a bipolar plate.

BACKGROUND OF THE INVENTION

Current collector plates or bipolar plates are an integral part of the fuel cell stack. Current collector plates function in a fuel cell stack as fluid distribution elements and function as bipolar plates to separate MEAs from one another. Each plate assembly is typically constructed of thin gauge metal sheets such as stainless steel coated with a conductive coating. Generally, two adjacent metal sheets are joined together forming a conductive heat exchanger. The joined plate assembly has internal flow channels along its length for coolant flow. Channels on either side of the bipolar plate serve as distribution pathways for fuel and oxidant gas to adjacent current collectors. A hermetic seal is required around the perimeter of the joined plates to prevent mixing of the coolant, fuel, oxidant gas and reactant products. High conductivity must be maintained between the two metal sheets that form the bipolar plate to achieve efficient fuel cell operation.

A conventional method of constructing a bipolar plate has been to first stamp the flow channels into the sheet material and subsequently join the sheets together. Stamping however is unfavorable because it subjects the sheets to high strains and distortion. In addition, joining stamped structures may be complicated. First, after stamping, there is minimal sheet to sheet contact between flow channels, thus, alignment and weld containment are difficult. Secondly, access for joining between the flow channels is obstructed by the flow channel structure.

A variety of joining techniques have been considered to overcome the drawbacks associated with conventional stamping followed by joining. These include brazing, adhesive bonding and fusion welding. These too, however, present unfavorable drawbacks when performed subsequent to a stamping operation. Brazing of austenitic stainless steel has been successful, but is costly. The cost is partially attributed to the acid cleaning and batch coating necessary after the brazing operation. Both adhesive bonding and fusion welding allow the stainless sheet to be acid cleaned and coated with a continuous coil operation prior to joining which is less costly. However, adhesive bonding suffers from durability issues regarding strength and conductivity. Fusion welding is difficult due to alignment concerns. It is necessary to position opposing lands on respective sheets in a proper orientation prior to welding for a successful joining operation which requires accuracy and is time consuming.

SUMMARY OF THE INVENTION

A method for making a current collector plate includes providing a first sheet of material having a first bonding face and a first outer face. A second sheet of material is provided having a second bonding face and a second outer face. A work area is defined on at least one of the first bonding face and the second bonding face. The first and second sheets are bonded together at a bonding area which is different from the work area. The bonded first and second sheet is placed into a die having a pattern defining at least one flow channel. Fluid is injected between the first and second sheets thereby causing at least one of the first and second sheets to project outward at the work area causing at least one flow channel to be formed in the work area as defined by the die pattern.

According to other features, an anti-bonding material is placed on at least one of the first bonding face and the second bonding face. Bonding the first and second sheets together includes contacting the first bonding face with the second bonding face. A force is imposed onto at least one of the first and second outer face thereby joining the first and second sheets at the bonding area.

According to yet other features, bonding the first and second sheets together includes welding the sheets together at the bonding area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
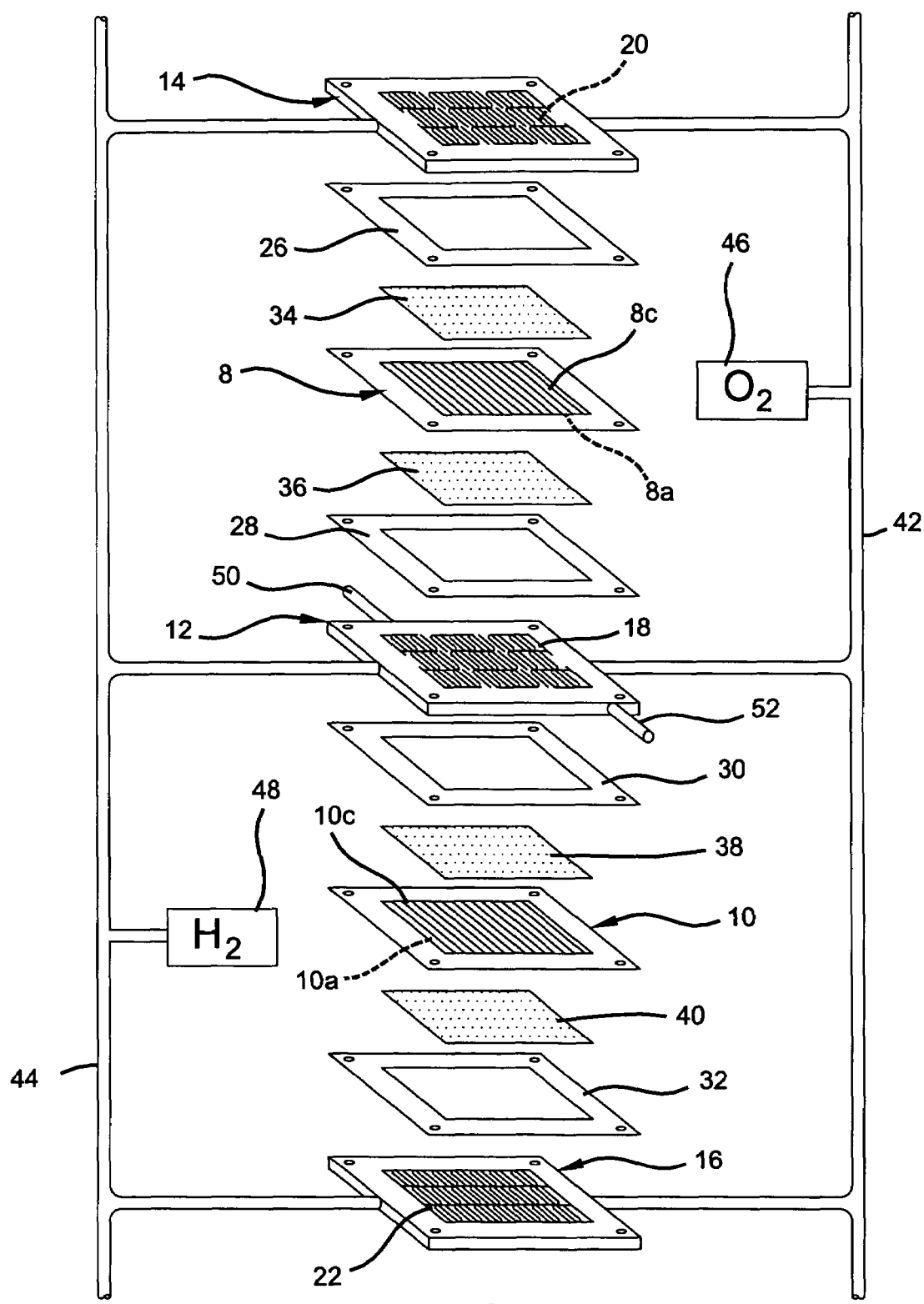
FIG. 1 is a schematic isometric exploded illustration of a PEM fuel stack.

The following description of the preferred embodiment is merely exemplary in nature and is in no way intended to limit the invention, its application, or uses. For purposes of clarity, the same reference numbers will be used in the drawings to identify similar elements. As used herein, the term bonding includes, but is not limited to, fusion welding and solid state welding.

FIG. 1 schematically depicts a partial PEM fuel cell stack having a pair of membrane-electrode-assemblies (MEAs) 8 and 10 separated from each other by a non-porous, electrically-conductive bipolar plate 12. Each of the MEAs 8, 10 have a cathode face 8c, 10c and an anode face 8a, 10a. The MEAs 8 and 10, and bipolar plate 12, are stacked together between non-porous, electrically-conductive, liquid-cooled bipolar plates 14 and 16. The bipolar plates 12, 14 and 16 each include flow fields 18, 20 and 22 having a plurality of flow channels formed in the faces of the plates for distributing fuel and oxidant gases (e.g., $H_2$ and $O_2$) to the reactive faces of the MEAs 8 and 10. Nonconductive gaskets or seals 26, 28, 30 and 32 provide a seal and electrical insulation between the several plates of the fuel cell stack.

Porous, gas permeable, electrically conductive sheets 34, 36, 38 and 40 press up against the electrode faces of the MEAs 8 and 10 and serve as primary current collectors for the electrodes. Primary current collectors 34, 36, 38 and 40 also provide mechanical supports for the MEAs 8 and 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass therethrough.

Bipolar plates 14 and 16 press up against the primary current collector 34 on the cathode face 8c of MEA 8 and the primary current collector 40 on the anode face 10a of MEA 10. The bipolar plate 12 presses up against the primary current collector 36 on the anode face 8a of MEA 8 and against the primary current collector 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and air delivered to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$ depleted anode gas from the anode flow field and $O_2$ depleted cathode gas from the cathode flow field. Coolant plumbing 50 and 52 is provided for supplying and exhausting liquid coolant to the bipolar plate 12, as needed. It is appreciated that coolant may additionally or alternatively be provided to the bipolar plates 14 and 16.

Figure 2:
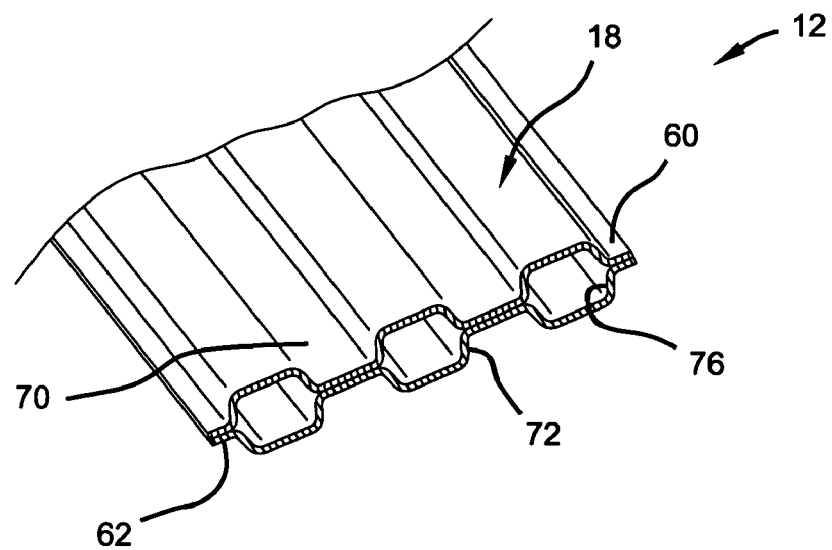
FIG. 2 is a sectional view of a cooled bipolar plate of FIG. 1.

Turning now to FIG. 2, the bipolar plate 12 is shown in greater detail. The bipolar plate 12 generally includes a first and second plate 60, 62. The first and second plate 60, 62 are preferably comprised of a conductive material such as aluminum alloy or stainless steel for example. The flow channels 18 of the bipolar plate 12 are further defined by an anode flow field 70 disposed on an outer surface of the first plate 60, a cathode flow field 72 disposed on an outer surface of the second plate 62 and a coolant flow field 76 disposed between the first and second plates 60, 62. In operation, the anode flow field 70 of the first plate 60 distributes the fuel to the anode face 8a of the MEA 8. Similarly, the cathode flow field 72 of the second plate 62 distributes the oxidant gas to the cathode face 10c of the MEA 10. Coolant is communicated through the coolant flow field 76 through the coolant plumbing 50 and 52.

With reference now to FIGS. 3A-6, a method of making the bipolar plate 12 according to the present invention will be described in greater detail. In a first method, the first and second plates 60 and 62 are joined prior to forming the channels 18 of the flow fields 70, 72 and 76. First, a strip of conductive material 78 is rolled from stock or otherwise acquired. The strip should be in the annealed or softened condition. Next, an anti-bonding material 80 (FIG. 3A) is placed onto a bonding face 82 of the strip of material 78 so as to form a bonding area 94 thereon. The anti-bonding material 80 defines a work area which is an area to be worked so as to form a flow field pattern in a flow field area. The area absent the anti-bonding material defines the bonding area or non-work area 94. The anti-bonding material 80 may comprise colloidal graphite for example. It is appreciated however that other anti-bonding materials may be employed.

Figure 3A:
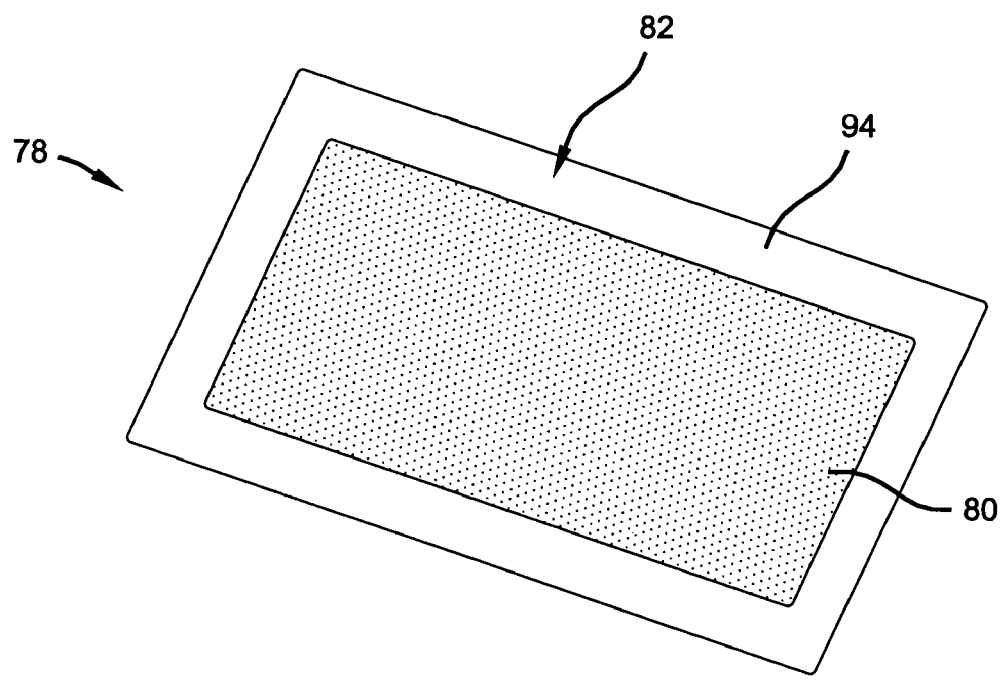
FIG. 3A is a perspective view of a sheet of conductive material having an anti-bonding material disposed thereon.

The anti-bonding material 80 is placed in a region sufficient to accommodate a desired flow field area shown as a rectangular area (FIG. 3A). It is appreciated that other shapes may similarly be employed. Next, the strip of material 78 having the anti-bonding material 80 along with a complementary strip of conductive material 88 is passed through a rolling mill. The two strips of material 78 and 88 are bonded together in the areas that did not contain the anti-bonding pattern (the bonding area 94, FIG. 3C). The rolling mill imposes a compression force onto the two sheets 78, 88 causing a thickness reduction and a metallurgical bond at the bonding area 94. The two bonded sheets 78, 88 comprise a two-piece bonded plate and further represent the first and second plate 60, 62 of the bipolar plate 12.

Figure 3B:
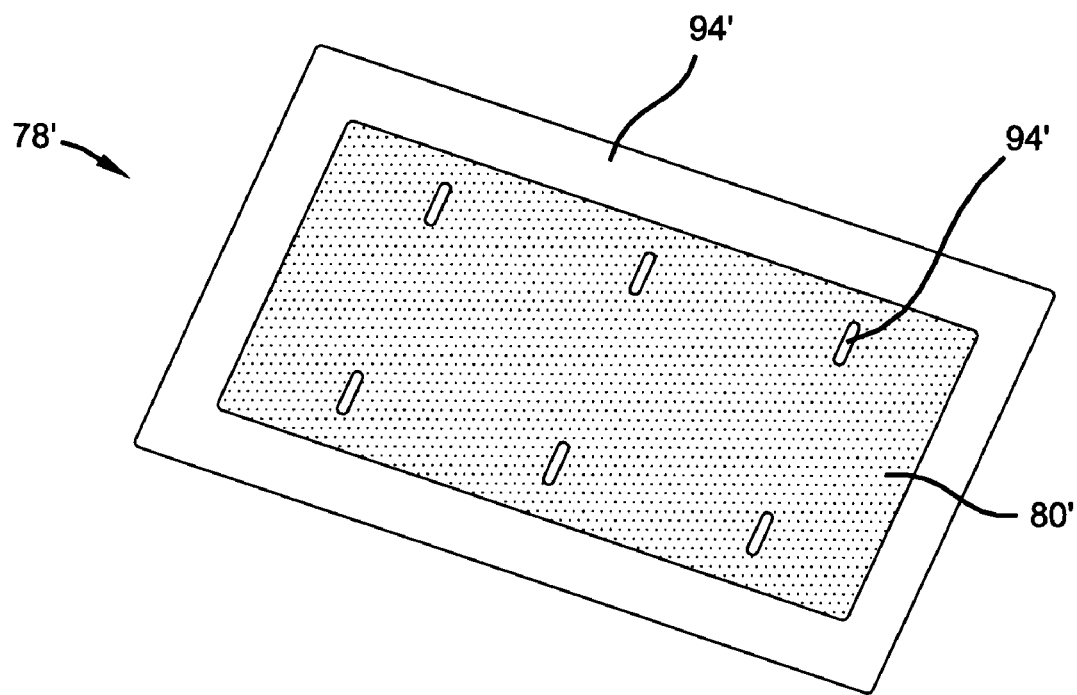
FIG. 3B is a perspective view of a sheet of conductive material having an anti-bonding material disposed thereon according to additional features.
Figure 3C:
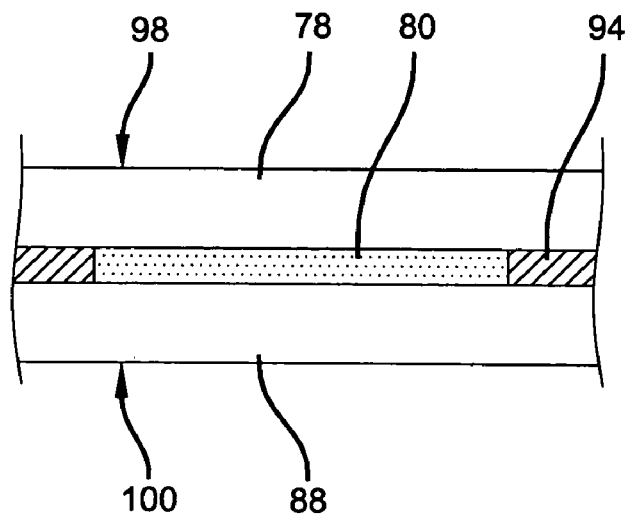
FIG. 3C is a cross sectional view of a first and second bonded sheet.

As shown in FIG. 3B a conductive strip of material 78' according to an alternate embodiment is shown. The conductive strip of material 78' includes a work area 80' having predetermined areas 94' absent the anti-bonding material. The predetermined areas 94' arranged along the work area 80' provide an additional bonding area for bonding with the second sheet 88 during roll bonding. The additional bonding area further encourages electrical communication between the first and second sheet 78' and 88 during operation in the fuel cell stack. It is appreciated that areas 94' may be placed in alternate positions and in different quantity across the work area 80'. Moreover, the areas 94' may each comprise a smaller or larger area as desired.

Figure 4:
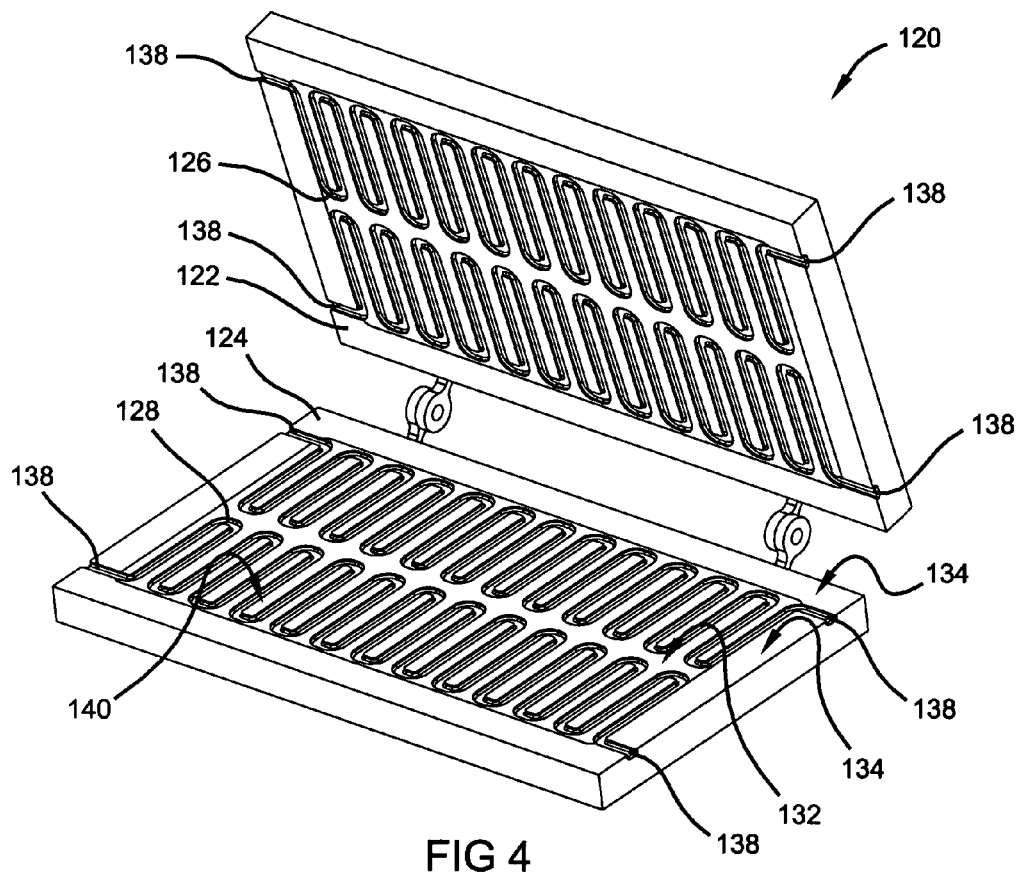
FIG. 4 is a perspective view of a die incorporating flow paths according to the present invention.
Figure 5:
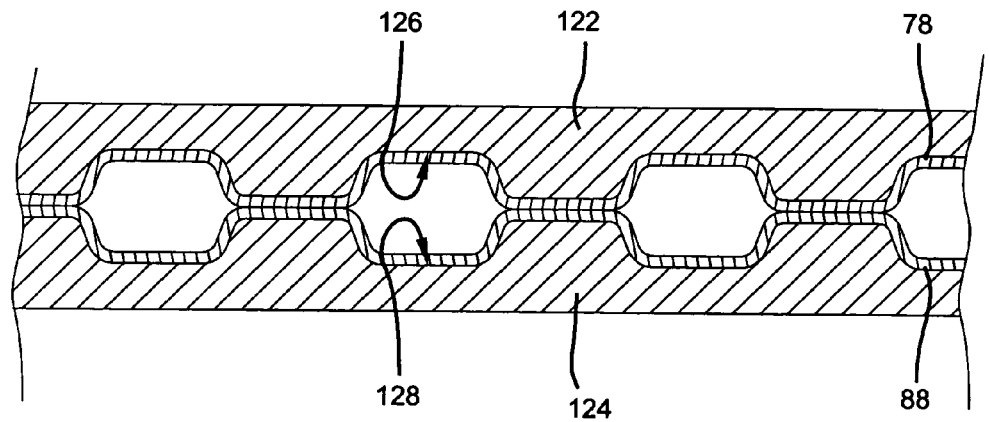
FIG. 5 is the cutaway view of FIG. 3C shown after a pressure forming operation.

With specific reference to FIGS. 4 and 5 a die 120 having first and second die portions 122 and 124 will be described. Die portions 122 and 124 are shown hingedly coupled however alternate arrangements may also be employed. Die portions 122 and 124 incorporate respective flow fields 126 and 128 formed therein. It is appreciated that the flow fields 126 and 128 are merely exemplary and may comprise alternative patterns as desired. An inner section 132 of the die 120 is arranged to accept the work area 80 therebetween. Similarly, a border portion 134 aligns with the bonding area 94 during bonding. Ports 138 are arranged in the die 120 for introducing fluid. Although four ports 138 are shown associated with each die portion 122 and 124, alternate arrangements may similarly be employed. As illustrated in FIG. 5, the flow fields 126 and 128 define an outer boundary for the sheets 78 and 88 to be urged into upon fluid introduction.

Figure 6:
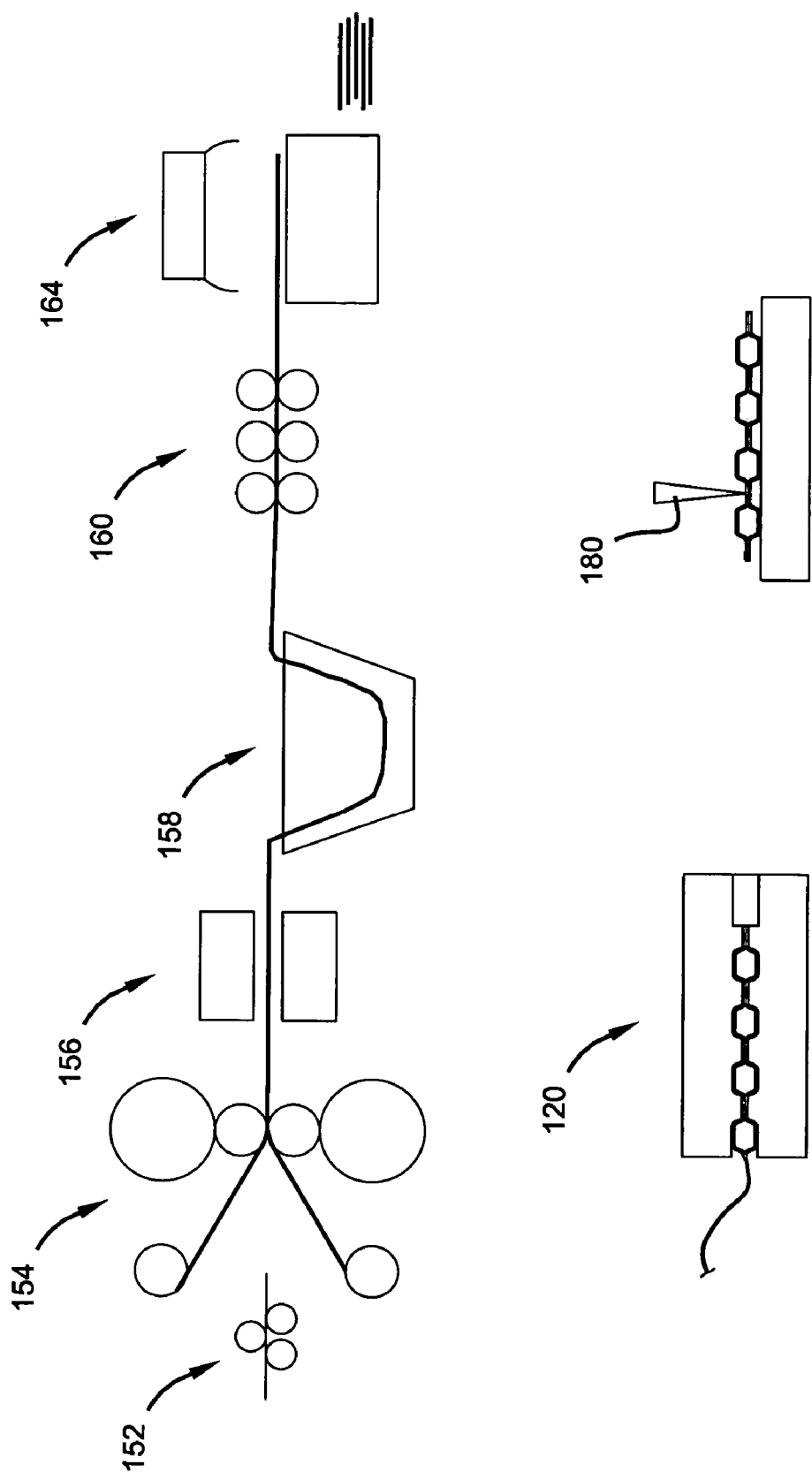
FIG. 6 is a depiction of an exemplary assembly process according to the present invention.
Figure 7:
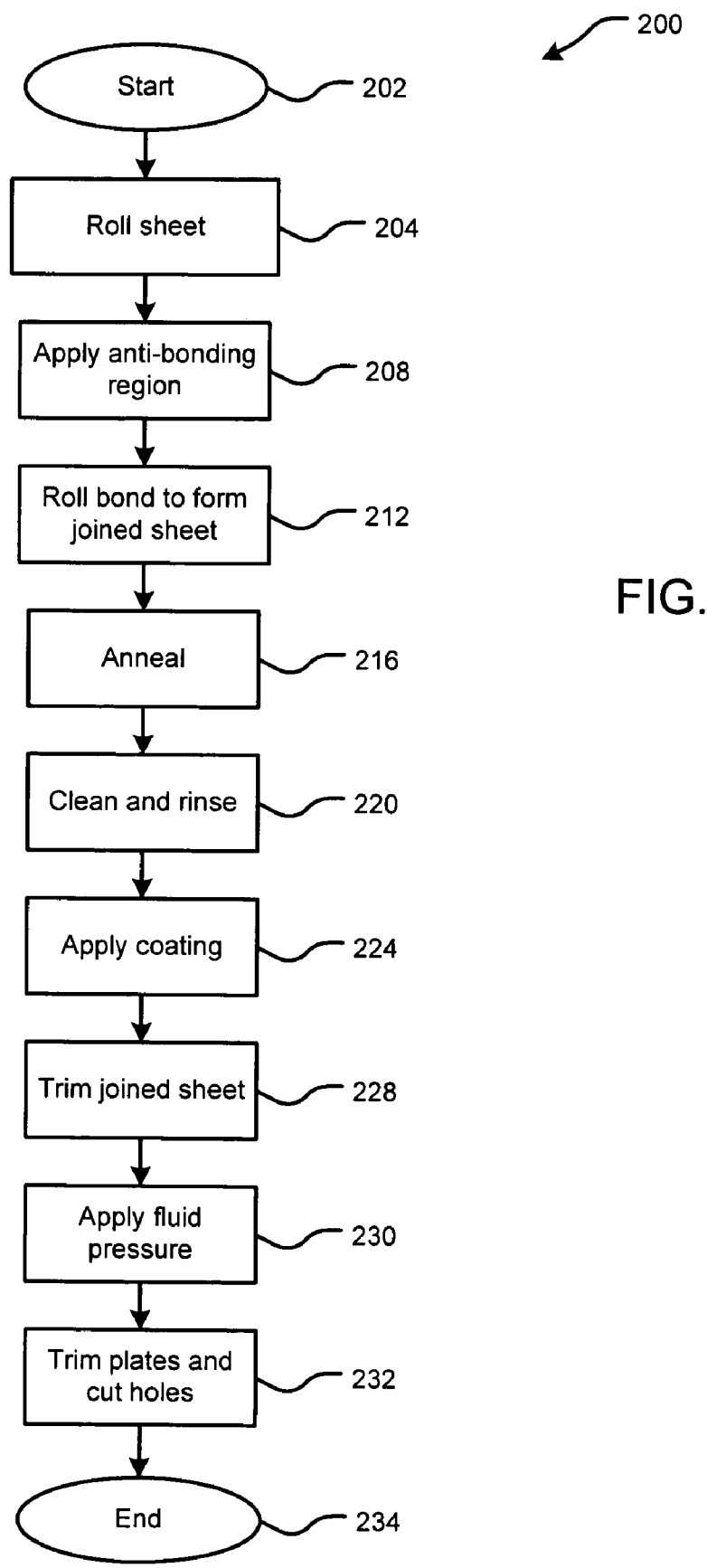
FIG. 7 is a flow diagram illustrating steps for roll bonding and pressure forming a bipolar plate according to the present invention.

Turning now to FIGS. 6 and 7 steps for fabricating a bipolar plate according to the present invention are shown generally at 200. Fabrication begins with step 202. In step 204 the sheet of material 78 is rolled from stock. In step 208, the anti-bonding material 80 is placed in a desired region onto the sheet of material 78 through a rolling applicator 152. In step 212 the sheet of material 78 along with the complementary sheet of material 88 is introduced into a rolling mill 154. The rolling mill 154 provides a bond onto the bonding area 94 thereby joining the two sheets 78 and 88 together. In step 216, the joined sheets 78, 88 are annealed with an annealing device 156. In step 220 the sheets 78, 88 are cleaned through a continuous clean and rinse bath 158.

In step 224, a coating to encourage conductivity is applied through a roll coating apparatus 160 on the outer surfaces 98, 100 (FIG. 3C) of the sheets 78, 88. In step 228 the sheets 78, 88 are cut from the roll by a blanking press 164 defining the first and second plates 60, 62. The plates 60, 62 are then placed into the die 120 having the flow channels 126 and 128 incorporated on respective sides 122 and 124. Fluid is introduced between the plates 60, 62 in step 230 causing the sheets 78 and 88 to expand at the work area 80 into the flow channels 126 and 128 of the die 120. In step 232 the newly formed bipolar plates 12 are trimmed and holes including header apertures are placed in desired locations by a trimming tool 180. Fabrication ends in step 234.

It is appreciated that some of the steps 200 outlined in the preceding discussion may be modified or placed in an alternative sequence. For example the application of the conductive coating in step 224 may alternatively be applied before the roll bonding step 212. In addition, header apertures may alternatively be formed during the fluid expansion step 230. Accordingly, die extensions may be incorporated into the die 120 that encourage headers to form in the header portion of the bipolar plate 12 upon fluid expansion. When using plate 78' it is appreciated that the bonding area 94' incorporated within the work area 80' is aligned with raised portions 140 provided between the flow channels 126 and 128 of the die 120.

According to other features, an alternate method of making a bipolar plate will be described with reference to FIGS. 8A-10. In the alternate method, the first and second plates 60 and 62 are joined prior to forming the channels 18 of the flow fields 70, 72 and 76. First, two strips of conductive material 278 and 288 are rolled from stock or otherwise acquired. Next, the two sheets 278 and 288 are welded together to define an outer boundary 280. The welded outer boundary 280 separates an inner area 282 and an outer perimeter 284. The inner area 282 defines a work area which is an area to be worked so as to form a flow field pattern in a flow field area. The two joined sheets 278 and 288 comprise a two-piece bonded plate and further represent the first and the second plate 60 and 62 of the bipolar plate 12.

Figure 8A:
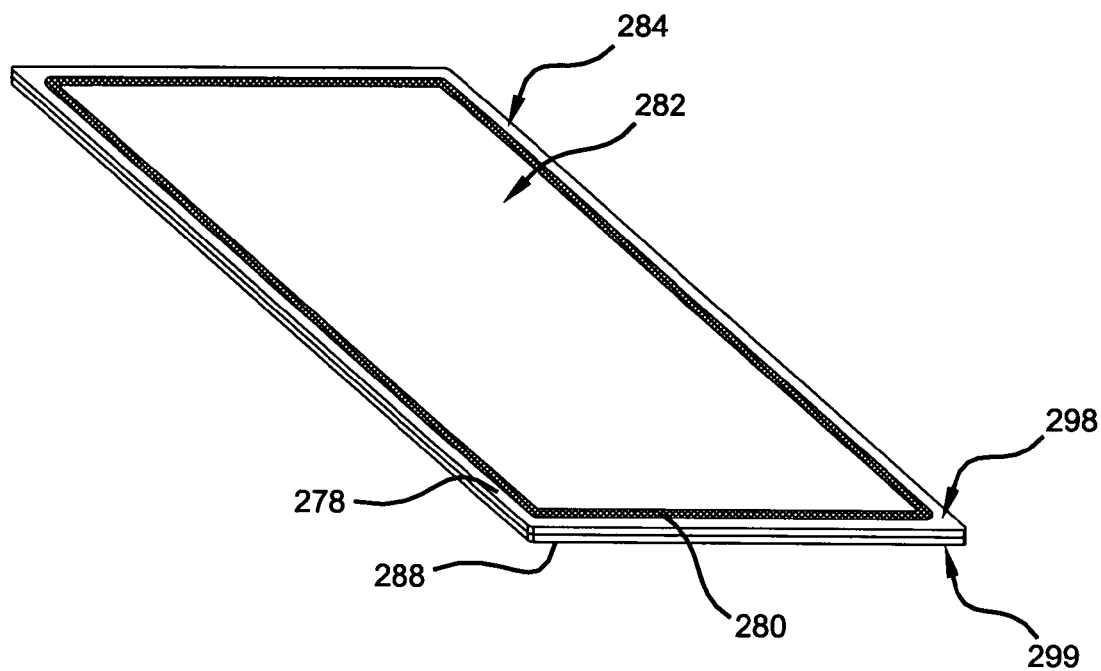
FIG. 8A is a perspective view of a pair of conductive sheets of material having a hermetic seal weld around a perimeter thereof according to additional features of the present invention.
Figure 8B:
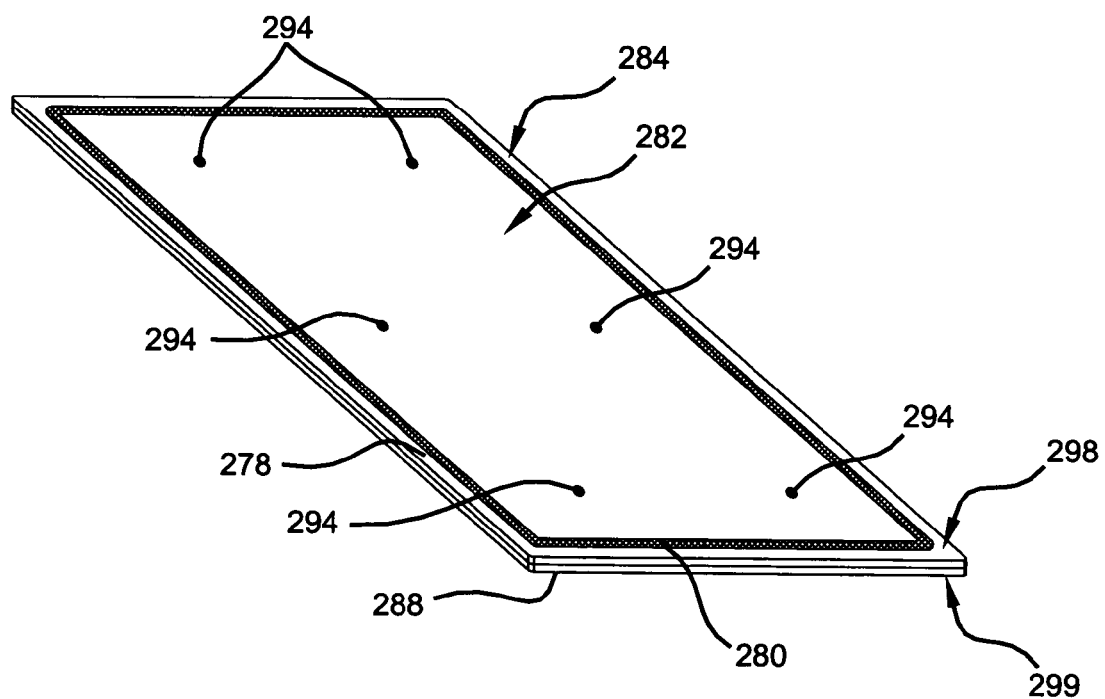
FIG. 8B is a perspective view of the pair of conductive sheets of material of FIG. 8A having additional spot welds incorporated thereon.

The two sheets 278 and 288 are welded together by solid state processes such as friction stir or ultrasonic welding or fusion processes such as laser welding, electron beam welding and seam welding. For all these joining techniques, there is less concern with sheet alignment since there are no formed features to align. In addition, access to the desired weld area is convenient since no flow channels exist to interfere with weld tools such as a friction stir tool or seam welding wheel. As illustrated in FIG. 8B, various spot or stitch welds 294 may be included to provide conduction at desired areas.

Figure 8C:
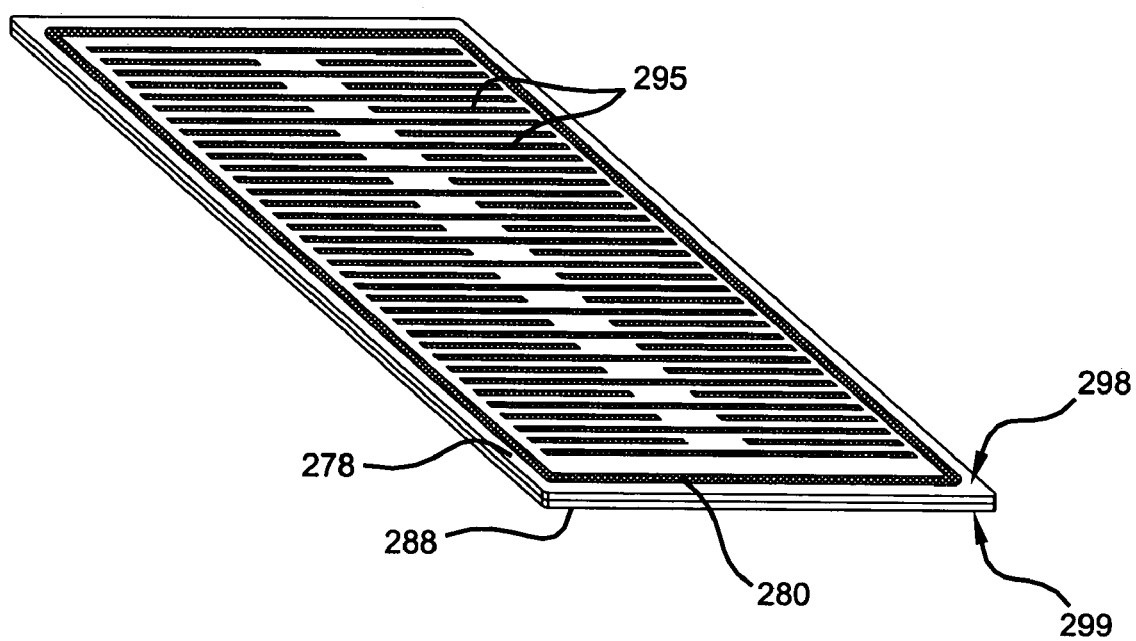
FIG. 8C is a perspective view of a pair of conductive sheets of material of FIG. 8A having additional welds incorporated to define the desired flow field.

The additional welds 294 further encourage electrical communication between the first and the second sheets 278 and 288 during operation in the fuel cell stack. It is appreciated that the welds 294 may be placed in alternate positions and in different quantity across the work area 282. Moreover, the areas 294 may each comprise a smaller or larger area as desired. As shown in FIG. 8C, a weld 295 is used to join the first and second sheets 278 and 288 at areas not identified for expansion. It is appreciated that the configuration of weld 295 is exemplary and may comprise various configurations to define a desired flow field.

Figure 9:
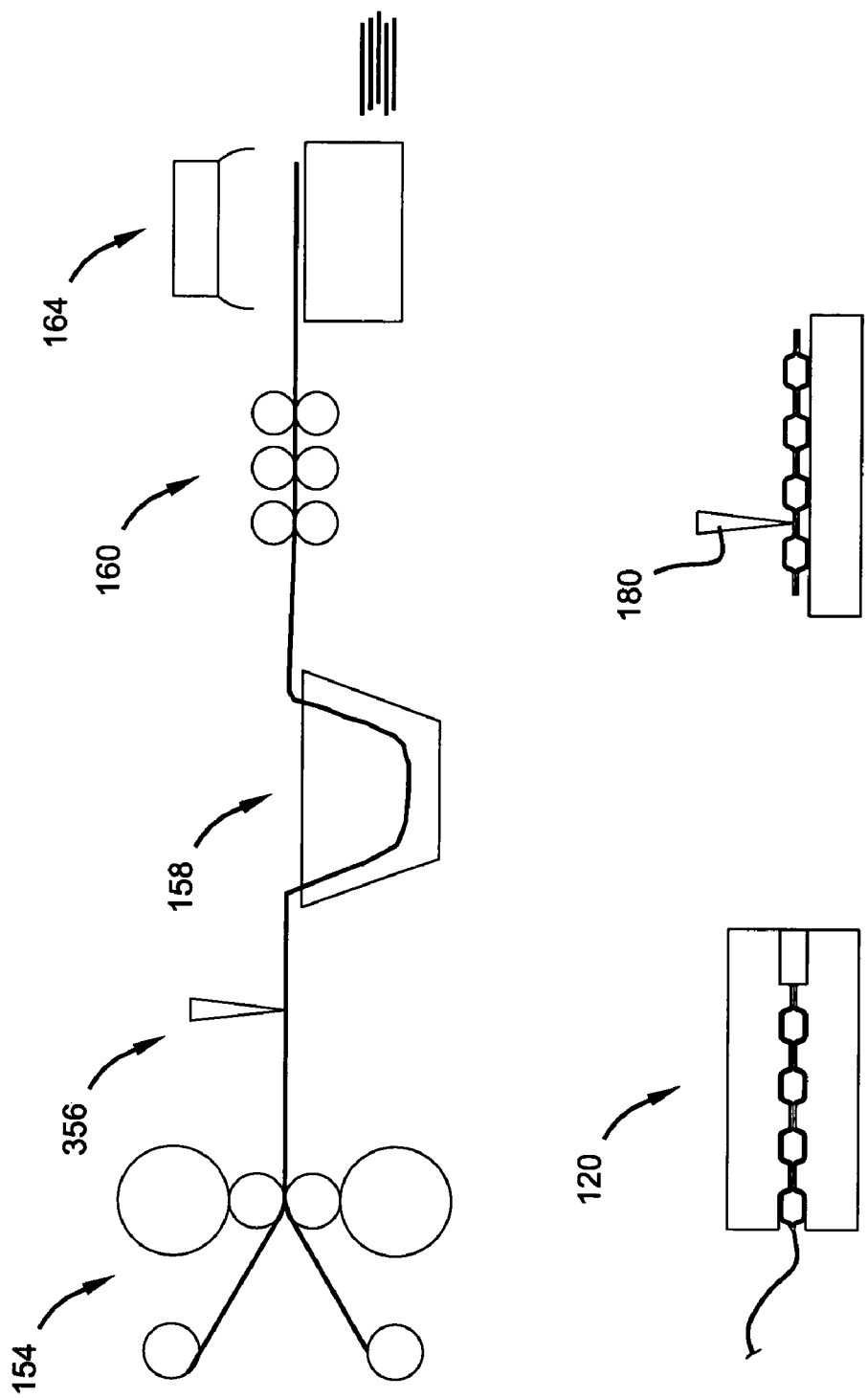
FIG. 9 is a depiction of an exemplary assembly process for forming a bipolar plate according to FIGS. 8A and 8B of the present invention.
Figure 10:
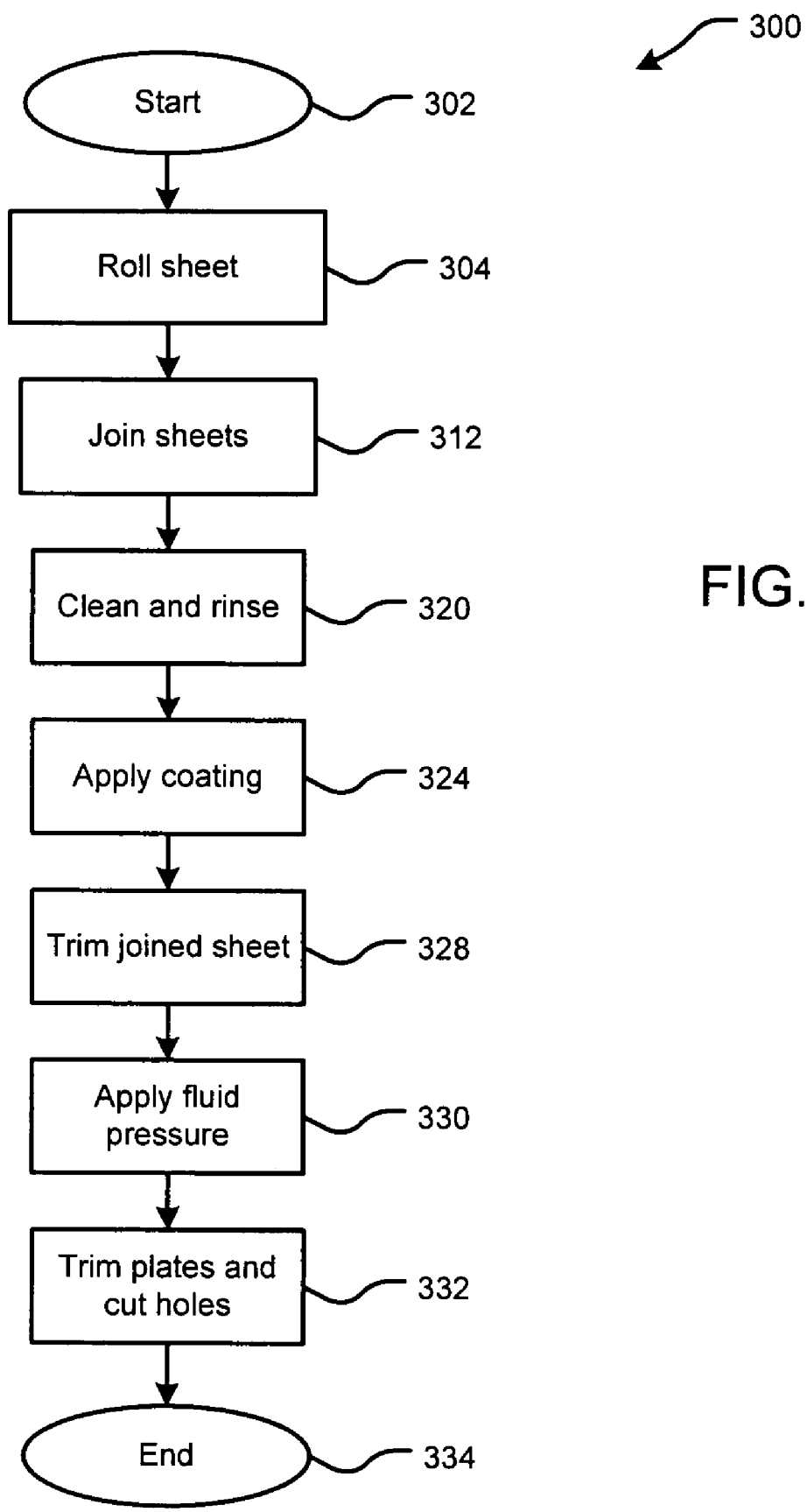
FIG. 10 is a flow diagram illustrating steps for forming a bipolar plate according to FIG. 9 of the present invention.

With specific reference to FIGS. 9 and 10, steps for fabricating a bipolar plate according to the present invention are shown generally at 300. Fabrication begins with step 302. In step 304, the sheets of material 278 and 288 are rolled from stock into an overlapping position through the rolling positioner 154. In step 312, the sheet of material 278 along with the complementary sheet of material 288 are welded or fused together by tool 356 to define the outer boundary 280. In step 320, the sheets 278 and 288 are cleaned through the continuous clean and rinse bath 158.

In step 324, a coating to encourage conductivity is applied through the roll coating apparatus 160 on the outer surfaces 298 and 299 (FIG. 8A). of the sheets 278 and 288. In step 328, the sheets 278 and 288 are cut from the roll by the blanking press 164 defining the first and second plates 60 and 62. The plates 60 and 62 are then placed into the die 120 having the flow channels 126 and 128 incorporated on respective sides 122 and 124. Fluid is introduced between the plates 60 and 62 in step 330 causing the sheets 278 and 288 to expand at the work area 282 into the flow channels 126 and 128 of the die 120. In step 332, the newly formed bipolar plate 12 is trimmed and holes including header apertures are placed in desired locations by the trimming tool 180. Fabrication ends in step 334.

It is appreciated that some of the steps 300 outlined in the preceding discussion may be modified or placed in an alternative sequence. For example, if the welding process can tolerate the presence of a conductive coating and the coating is not damaged too severely by the welding operation, the application of the conductive coating in step 324 may alternatively be supplied before the joining step 312. In addition, header apertures may alternatively be formed during the fluid expansion step 330. Accordingly, die extensions may be incorporated into the die 120 that encourage headers to form in the header portion of the bipolar plate 12 upon fluid expansion. When using the spot welds 294 (FIG. 8B), it is appreciated that the spot welds 294 are aligned with the raised portions 140 provided between the flow channels 126 and 128 of the die 120.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for making a current collector plate comprising:
   providing a first sheet of material having a first bonding face and a first outer face;
   providing a second sheet of material having a second bonding face and a second outer face;
   defining a work area on at least one of said first bonding face and said second bonding face;
   bonding said first and second sheets together at a bonding area which is different from said work area;
   placing said bonded first and second sheet into a die having a pattern defining at least one flow channel; and
   injecting fluid between said first and second sheets thereby causing at least one of said first and second sheets to project outward at said work area whereby said work area is expanded outwardly into said die pattern and said bonding area is contacted by said die pattern and precluded from expanding at said bonding area causing a first anode flow channel to be formed on said first outer face, a second self-contained coolant flow channel to be formed between said first and second sheets and a third cathode flow channel to be formed on said second outer face in said work area as defined by said die pattern, wherein said first anode, second self-contained coolant and third cathode flow channels each define a predetermined inlet and outlet.

2. The method of claim 1 wherein defining a work area includes placing an anti-bonding material on at least one of said first bonding face and said second bonding face.

3. The method of claim 2 wherein defining a work area includes placing said anti-bonding material in a generally rectangular pattern on at least one of said first bonding face and said second bonding face.

4. The method of claim 3 wherein placing said anti-bonding material includes leaving predetermined areas along said pattern absent said anti-bonding material; and
bonding said first and second sheets together includes bonding said sheets at said predetermined areas.

5. The method of claim 1 wherein bonding further includes:
contacting said first bonding face with said second bonding face; and
imposing a force onto at least one of said first and second outer faces thereby joining said first and second sheets at said bonding area.

6. The method of claim 5 wherein contacting said first bonding face with said second bonding face defines a first thickness; and
joining said first and second sheets at said bonding area defines a second thickness, said second thickness less than said first thickness.

7. The method of claim 6 wherein imposing a force includes roll bonding said first and second sheets together.

8. The method of claim 1 wherein bonding further includes:
welding said first and second sheets together at said bonding area.

9. The method of claim 1 wherein injecting fluid between said first and second sheet includes forming a flow channel between said first and second sheet.

10. The method of claim 1, further comprising applying a conductive coating onto said first and second outer face.

11. A method for making a current collector plate comprising:
placing an anti-bonding material onto a first surface of a first sheet of material thereby forming a work area defined by said anti-bonding material and an adjacent non-work area;
contacting a second sheet of material with said anti-bonding material;
forming a metallurgical bond between said first and second sheets at said non-work area thereby creating a two-piece bonded plate;
placing said two-piece bonded plate into a die having a pattern defining at least one flow channel; and
introducing fluid between said two-piece bonded plate to cause at least one of said work area of said first and second sheets to project into said die pattern at said work area and said non-work area to be engaged by and precluded from projecting by said die thereby causing a first anode flow channel to be formed on an outer surface of said first sheet of material, a second self-contained coolant flow channel between said two-piece bonded plate and a third cathode flow channel on an outer surface of said second sheet of material by said pattern of said die, wherein said first anode, second self-contained coolant and third cathode flow channels each define a predetermined inlet and outlet.

12. The method of claim 11 wherein forming a work area includes placing said anti-bonding material in a generally rectangular pattern along one of said first and second sheet.

13. The method of claim 12 wherein placing said anti-bonding material includes leaving predetermined areas along said pattern absent said anti-bonding material; and
bonding said first and second sheets together includes bonding said sheets at said predetermined areas.

14. The method of claim 11 wherein forming a metallurgical bond includes roll bonding said first and second sheet together.

15. The method of claim 11, further comprising rolling said first and second sheet from a rolled stock of material.

16. The method of claim 11, further comprising applying a conductive coating onto an outer face of said respective first and second sheets.

17. A method for making a current collector plate comprising:
providing a first sheet of conductive material;
providing a second sheet of conductive material;
placing an anti-bonding material in a desired region over a bonding surface of said first sheet of conductive material, said region of anti-bonding material defining an anti-bonding region along said first sheet, wherein the remaining surface of said bonding surface absent said anti-bonding material defines a bonding area;
contacting said second sheet of conductive material with said anti-bonding material of said first sheet of conductive material;
roll bonding said first and second sheets together whereby said first and second sheets form a metallurgical bond therebetween at said bonding area;
placing said bonded sheets having a first and second outer face into a die having a pattern defining at least one flow channel; and
injecting fluid between said first and second bonded sheets whereby said anti-bonding area is expanded outwardly into said die pattern and said bonding area is contacted by said die pattern and precluded from expanding thereby forming a first anode flow channel on said first outer face, a second self-contained coolant flow channel through said desired region and a third cathode flow channel on said second outer face, wherein said first anode, second self-contained coolant and third cathode flow channels each define a predetermined inlet and outlet.

* * * * *